April 12, 1927.
A. J. PUTNAM ET AL
ARTIFICIAL BAIT
Filed July 6, 1926
1,624,116
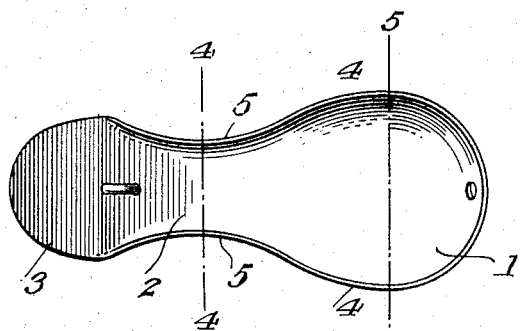
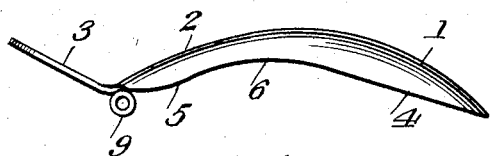
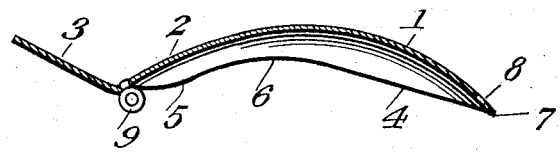
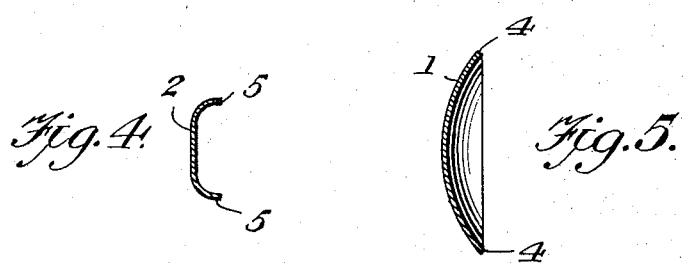
INVENTORS
A. J. Putnam
J. W. Wilson
BY
ATTORNEY Patented Apr. 12, 1927.

1,624,116

UNITED STATES PATENT OFFICE.

ALBERT J. PUTNAM AND JOHN W. WILSON, OF KALISPELL, MONTANA.

ARTIFICIAL BAIT.

Application filed July 6, 1926. Serial No. 120,684.

This invention relates to improvements in artificial bait, particularly designed for use in casting and trolling, and one object of the invention is to provide an artificial spoon bait which is so constructed, balanced and adapted to be controlled by the line as to give it movements rendering it highly efficient as a lure for slow or fast trolling.

Another object of the invention is to provide an artificial bait which is simple of construction and free from complex parts, and at the same time strong and durable, so that it can not be easily bent or warped and rendered deficient in action.

The invention consists of the features of construction, combination and arrangement of parts, hereinafter fully described and claimed, reference being had to the accompanying drawing, in which:—

Figure 1 is a bottom plan view of our improved artificial bait.

Figure 2 is a side elevation of the same.

Figure 3 is a central longitudinal section through the bait.

Figure 4 is a cross-section on line 4—4 of Figure 1.

Figure 5 is a cross-section on the line 5—5 of Figure 1.

In carrying our invention into practice, we provide an artificial bait comprising a spoon portion 1, a shank portion 2 and a head vane portion 3, which are preferably, but not necessarily, of unitary construction and formed of a single piece of sheet metal of the desired stiffness. The spoon portion 1 is transversely of concavo-convex form and curved on the arc of a circle, as shown in Figure 5, while the shank portion 2 is also transversely of concavo-convex form and preferably cross-sectionally U-shaped, as shown in Figure 4. The side edges of the portions 1 and 2 respectively provide flanges 4 and 5, and the flange 4 at each side of the bait is continuous with the flange 5 at the same side of the bait, each continuous flange 4—5 having a concaved edge portion 6, decreasing its depth, for a portion of the length of the shank 2. The shank 2 is of relatively less width than the spoon 1 and has its flanges 5 longitudinally concaved, said shank being of minimum width at the center and thence increasing in width and having its side flanges diverging in opposite directions so that the shank tapers from its center toward the spoon and vane portions 1 and 3, respectively.

The body portions of the spoon 1 and shank 2 extend on a continuous longitudinal concavo-convex curvature, such curvature preferably being on a parabolic line between the tip or tail end 7 of the spoon and the head end of the shank 2, at the point of juncture of the latter with the vane 3, such curvature and the described formation of the flanges 4 and 5 providing a spoon which is of maximum weight along the spoon portion and between the point of juncture of the shank and spoon portions and the tail end 7 of the spoon, whereby the bait is adapted to dip down into the water at its tail end and the bait to normally assume an upright position in the water. This tendency of the bait to dip down into the water at its tail end is counteracted in practice by the elevating effect of the water, as the bait is trolled, on the concaved side of its parabolic curved section, so that, according to the degree of speed at which the bait is trolled, it will float to a greater or less extent below the surface and, at the same time, be caused to tilt, by the counteracting weight and float effects, or oscillated upwardly and downwardly in the water on a central transverse axis.

At its tail portion the bait is provided with an opening 8 and at its head portion the bait is provided with an eye or like fastening means 9, projecting from its underface, for suitable attachment of the hook and trolling line. The member 9 is located at the point of juncture of the shank 2 with the vane 3, which latter extends upwardly and forwardly at an oblique angle to the chord of the line of curvature of the spoon and shank, so that the pull of the line will be applied at such a point as to counteract the weight of the hook or hooks and to accentuate the up and down motion of the bait in the water above referred to. The inclined vane 3 serves as a counterbalance located above the plane of the line to automatically govern or oppose, to a certain extent the downward dipping of the tail end of the bait into the water, thus preventing it from assuming an absolutely perpendicular position in the water when in a state of rest. When the bait is being trolled, the vane 3 acts as an aerofoil, against the underside of which a current of air, of greater or less strength, according to the trolling speed of the bait, will act to hold the tail end of the bait to a greater or less degree down as it tends to rise progressively according to its rate of speed. Hence an up and down tilting motion of the bait in the water on a transverse axis will be maintained at all times irrespective of its speed and the depth to which it is submerged in the water.

It will be noted that by reason of the shape of the flanges 4 and 5, these flanges extend on opposite sides of the bait on sinusodial lines, and thus act to give the bait as it is being trolled a lateral or sidewise motion, alternately in opposite directions, on a vertical axis, thus simulating the swimming motion of a fish and adding to its luring properties. The flanges also serve as stabilizers or rigid fins to prevent the bait from turning over in the water and assuming a bottom-upward position, so that its working position in the water will at all times be maintained. It will, of course, be understood that in practice the bait may be painted or enameled, silvered, gilted or otherwise finished to simulate the appearance of a living fish or to further add to its attractiveness as a lure.

It will be obvious, from the foregoing description, that our invention provides an artificial bait for casting or trolling which is adapted for slow as well as fast trolling, which will maintain its working position in the water, and which will have maximum efficiency as a lure. It will also be seen that, by reason of the construction defined, a simple type of bait is provided free from complex parts, and which is at the same time strong and rigid so that it is not liable to be bent or otherwise deformed with a loss of efficiency.

Having thus fully described our invention, we claim:—

1. An artificial bait having a spoon portion at its tail end provided with means for attachment of a hook, a vane portion at its head end, and a shank portion between said spoon and vane portions, said spoon and shank portions being longitudinally and transversely of concavo-convex form, and an attaching member located at the junction of said shank and vane portions, the vane portion extending upwardly and forwardly at an oblique angle to the chord of the line of longitudinal curvature of said spoon and shank portions.

2. An artificial bait having a spoon portion at its tail end provided with means for attachment of a hook, a vane portion at its head end, and a shank portion between said spoon and vane portions, said shank portion being of less width than the spoon portion and both portions being longitudinally and transversely of concavo-convex form, providing sinuous flanges at the sides of the spoon and shank portions, and an attaching member located at the junction of said shank and vane portions, the vane portion extending upwardly and forwardly at an oblique angle to the chord of the line of longitudinal curvature of said spoon and shank portions.

In testimony whereof we affix our signatures.

ALBERT J. PUTNAM.
JOHN W. WILSON.